(12) United States Patent
Mola et al.

(10) Patent No.: US 9,062,404 B2
(45) Date of Patent: *Jun. 23, 2015

(54) BEARING ASSEMBLY FOR WASHING MACHINE TUBS

(75) Inventors: Roberto Mola, Turin (IT); Gianpiero Scaltriti, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 327 days.

This patent is subject to a terminal disclaimer.

(21) Appl. No.: 13/044,429

(22) Filed: Mar. 9, 2011

(65) Prior Publication Data

US 2011/0219823 A1 Sep. 15, 2011

(30) Foreign Application Priority Data

Mar. 9, 2010 (IT) .............................. TO2010A0181

(51) Int. Cl.
*D06F 37/26* (2006.01)
*D06F 37/00* (2006.01)
*F16C 35/077* (2006.01)
*F16C 19/54* (2006.01)

(52) U.S. Cl.
CPC .............. *D06F 37/00* (2013.01); *D06F 37/262* (2013.01); *D06F 37/269* (2013.01); *F16C 35/077* (2013.01); *F16C 19/54* (2013.01)

(58) Field of Classification Search
CPC ...... D06F 37/00; D06F 37/262; D06F 37/269
USPC ..................................... 68/139, 140
See application file for complete search history.

(56) References Cited

U.S. PATENT DOCUMENTS

2005/0281501 A1* 12/2005 Mazzocco ..................... 384/537
2009/0113941 A1* 5/2009 Kim ............................... 68/140
2009/0113943 A1* 5/2009 Lee ................................ 68/140

FOREIGN PATENT DOCUMENTS

EP          1950334 A1    7/2008
GB          2272913 A     6/1994
WO       WO2010010114 A2  1/2010

* cited by examiner

*Primary Examiner* — David Cormier
(74) *Attorney, Agent, or Firm* — Bryan Peckjian; SKF USA Inc. Patent Dept.

(57) ABSTRACT

A bearing assembly is for a washing machine, the washing machine having a tub and a drum rotatable about an axis, the bearing assembly includes first and second bearings spaced apart along the drum axis and a spacer disposed at least partially between the two bearings. A housing is connectable with the drum, configured to contain the bearings and the spacer, and includes an annular rim extending axially away from first bearing and generally coaxially about the drum axis, the rim defining a seat for a sealing element. Preferably, the housing is formed of a polymeric material and is molded to the tub.

10 Claims, 1 Drawing Sheet

BEARING ASSEMBLY FOR WASHING MACHINE TUBS

CROSS-REFERENCE

This application claims priority to Italian Patent Application No. TO2010A000181 filed on Mar. 9, 2010, the contents of which are incorporated fully herein by reference.

BACKGROUND OF THE INVENTION

The present invention relates to bearing assemblies, and more particularly to bearing assemblies for washing machine drums Bearing assemblies for rotatably supporting washing machine drums are known. In certain applications, the bearing assembly can be "co-molded", i.e., molded together, with the washing machine tub so as to become an integral part of the tub itself, which facilitates the washing machine assembly operations. Such a bearing assembly typically include two roller bearings arranged along an axis of rotation of a washing machine drum, a spacer interposed between the two bearings, and a cylindrical housing sleeve. The sleeve is often made of a plastic material and by co-molding around the two bearings and the spacer.

When the bearing assembly has been co-molded with the tub, a shaft of the drum is inserted through the bearing assembly itself in such a way as to engage both bearings and to protrude axially from the tub in order to be engaged kinetically with a motor of the washing machine. At the end opposite the one engaged with the motor, i.e. on what is known as the "wet" side, and corresponds to the interior of the tub, the drum shaft also passes through a seal which prevents liquids from entering the bearing assembly and which is fitted inside a seat created in the tub in a position that is coaxial with the axis of rotation of the shaft itself.

The extreme severity of the current conditions of co-molding by injection due to the very short production times and to the high injection pressures and temperatures has made the creation of the aforesaid seat highly critical in order to prevent irreversible deformations which, in the long term, could compromise the tightness capacities of the seal itself.

SUMMARY OF THE INVENTION

An object of the present invention is to make a bearing assembly that can be co-molded with washing machine tubs and that is free from the drawbacks described above.

According to this invention, a bearing assembly co-moldable with washing machine tubs comprises two roller bearings arranged along an axis of rotation of a drum of the washing machine, a spacer interposed between the two bearings, and a housing sleeve. The housing sleeve is preferably made of a plastic material and by co-molding around the two bearings and the spacer. The housing sleeve includes an annular rim that is coaxial with the axis of rotation and protrudes or extends axially from a first bearing of the two bearings so as to define a seat suitable for accommodating a sealing element.

BRIEF DESCRIPTION OF THE SEVERAL VIEWS OF THE DRAWINGS

The invention will now be described with reference to the attached drawings which illustrate a non-limitative example of embodiment, in which.

DETAILED DESCRIPTION OF THE INVENTION

Figure 2:
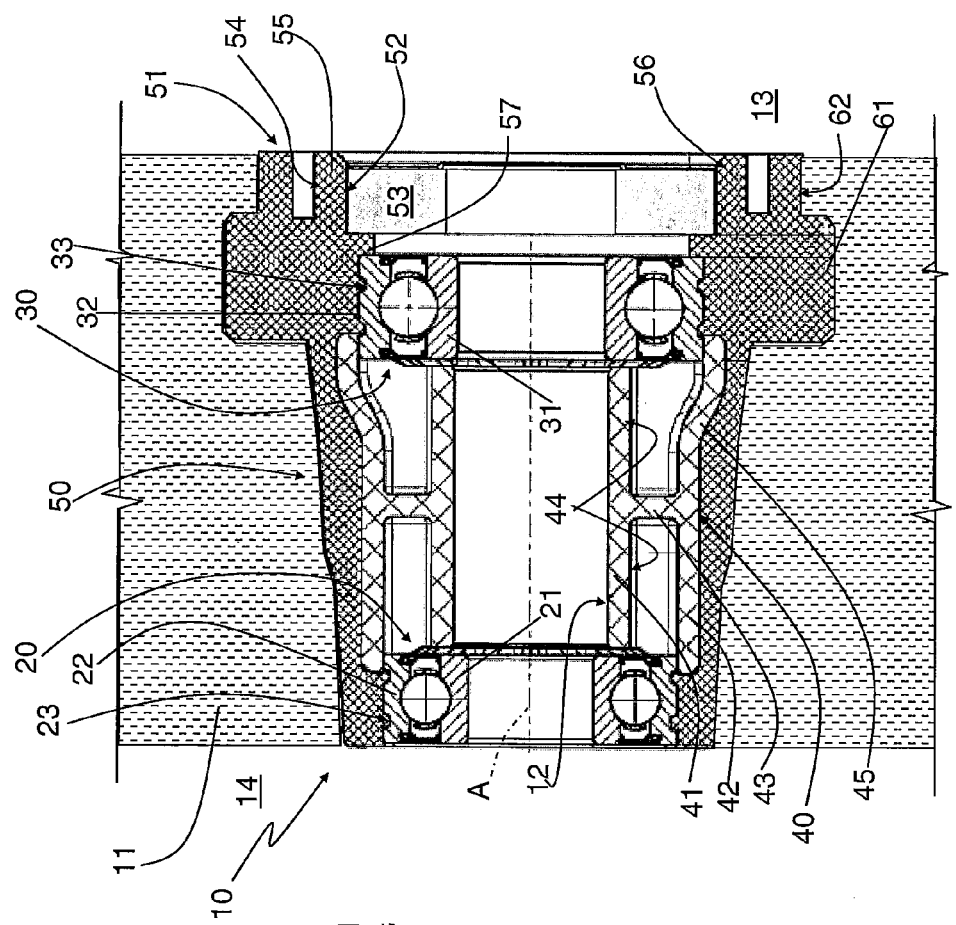
FIG. 2 is a section of the bearing assembly of FIG. 1 along the line A-A.
Figure 1:
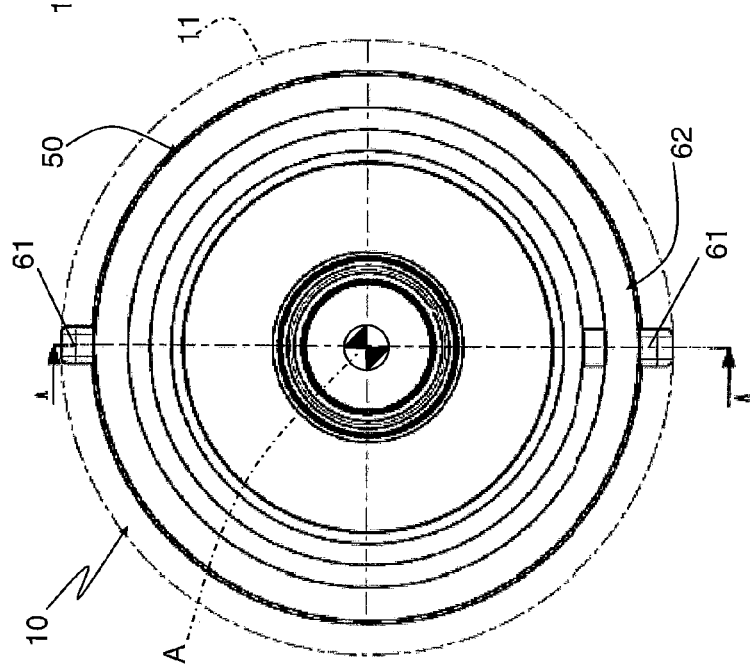
FIG. 1 is a front elevation view of a preferred form of embodiment of the co-moldable bearing assembly of this invention.

With reference to the attached drawing figures, the reference numeral "10" indicates a bearing assembly, in its entirety, that is "co-moldable" with a washing machine tub.

The bearing assembly 10 is capable of being co-molded with a tub, schematically depicted in the figures and indicated by 11, of a washing machine in order to constitute a single or integral component with the tub 11, thereby reducing the washing machine production time. The bearing assembly 10 basically comprises two roller bearings 20 and 30 spaced apart along the axis of rotation A of a drum (known and not illustrated) of the washing machine, a spacer 40 and a housing sleeve 50. The spacer 40 is preferably made of a metallic material and is interposed between the two bearings 20 and 30. Further, the housing sleeve 50 is preferably made of a plastic or polymeric material and, once again with a view to optimizing production times and costs, is co-molded around or about the two bearings 20 and 30 and the spacer 40.

When it has been co-molded with the tub 11, the bearing assembly 10 defines a sort of pipe 12 communicating between a wet side 13 inside the tub and a dry side 14 outside the tub 11 itself, and capable of being engaged internally by a support shaft (known and not illustrated) which supports the abovementioned drum and is arranged inside the pipe 12 so as to protrude at least partly from the dry side 14.

In order to reduce even further both the washing machine production costs and times, and also to increase the reliability of the watertight seal of the tub 11, the housing sleeve 50 includes a generally annular rim 51, which faces the wet side 13, and protrudes or extends generally axially away from the first bearing 30. The rim 51 is generally coaxial about the axis A of rotation and defines a seat 52 for a sealing element, schematically indicated in FIG. 2 by the number 53. The direct production of the seat 52 during co-molding of the sleeve 50 with the bearings 20 and 30, instead of during co-molding of the tub 11 with the bearing assembly 10, not only simplifies production of the tub 11, but also makes it possible to control the geometry of the seat 52 with greater precision and thereby increasing the reliability of the sealing element 53.

During molding, the injection pressure and temperature at which co-molding of the tub 11 with the bearing assembly 10 takes place can reach values that are particularly high and critical for the materials involved. Due to the importance of maintaining the geometrical characteristics of the seat 52 substantially identical to those obtained during co-molding of the bearing assembly 10, the housing rim 51 has a generally annular frontal groove 54 extending axially inwardly from a front surface of the rim 51, which is open axially toward the wet side 13 of the bearing assembly 10. The groove 54 is configured for engagement by a cylindrical stiffening body, the body having a form that is complementary to the form of the groove 54 itself, during molding of the bearing assembly 10 to the tub 11.

More specifically, the annular groove 54 extends axially inside the rim 51 with an axial depth that is lesser than an axial dimension of the rim 51. Further, the groove 54 defines a cylindrical bracket 55 having radial thickness which is lesser than an overall radial thickness of the rim 51. The bracket 55 is radially delimited or bounded radially inwardly by the seat 52. During co-molding of the tub 11 with the bearing assembly 10, the abovementioned cylindrical stiffening body (not shown) is inserted into the groove 54 in order to prevent any deformation of the bracket 55 while protecting the seat 52 from any possible deformation at the same time.

The seat 52, which has a cylindrical form, is delimited axially on the wet side 13 by an inlet bevel 56 capable of favouring the insertion of the sealing element 53 inside the seat 52 itself, and is axially delimited on the side of the bearing 30 by a shoulder 57 which is interposed between the bearing 30 and the seat 52, and also defines an axial shouldering element for fitting the sealing element 53.

As the overall stiffness of the bearing assembly 10 also contributes to the maintenance of the form characteristics of the seat 52, the spacer 40 is preferably formed as a box-type structure including an inner cylindrical body 41, and an outer shaped body 42 disposed coaxially about the inner body 41, and generally radial partition wall extending between and connecting the inner and outer bodies 41, 42. The bodies 41 and 42 with the partition wall 43 define two annular spaces 44, so that the overall weight of the spacer 40 is lower than the weight of a solid spacer with the same stiffness characteristics.

The internal cylindrical body 41 is axially separate from both the inner rings 21 and 31 of the bearings 20 and 30, while the overall axial dimension of the body 42 is greater than the axial dimension of the body 41 and is arranged both axially and radially in contact with both the outer rings 22 and 32 of the bearings 20 and 30.

As the radial dimensions of the first bearing 30 are greater than the radial dimensions of the second bearing 20, because it has to support a greater load as it is positioned closer to the aforementioned drum, the body 42, which is maintained parallel to the body 41 on the bearing 20 side, has, on the bearing 20 side, a conical portion 45 increasing its own outer diameter. In this way, each opposite end of the body 42 arranges itself radially around and in contact with a portion of the outer rings 23 and 33 and, in the same way, defines an axial reference for the rings 23 and 33 themselves with the univocal definition of an axial distance between the bearings 20 and 30, while allowing the bearings 20 and 30 to be blocked in position when they are arranged in the mould for co-molding the sleeve 50.

Furthermore, in order to increase the axial tightness between the sleeve 50 and the bearings 20 and 30, both the outer rings 22 and 32 are provided with respective pairs of external grooves 23 and 33 which, during co-molding of the sleeve 50, are filled with the same material as the sleeve 50.

Finally, the sleeve 50 has an outer surface and one or more radial "anti-rotational" teeth 61, each of which extends generally radially from the outer surface 62 of the sleeve 50. The one or more teeth 61 are each configured to engage with the tube 11 so as to prevent rotation of the bearing assembly 10 relative to the tub 11. There could also be only one of these radial teeth 61, but in order to give the entire bearing assembly 10 a symmetrical form it is preferable to envisage two teeth 61 arranged in symmetrical positions vis-à-vis the axis A.

It is intended that the invention not be limited to the form of embodiment described and illustrated here, which is to be considered as an example of embodiment of the bearing assembly co-moldable with washing machine tubs which is, instead, open to further modifications as regards forms and arrangements of the parts, and construction and assembly details.

We claim:

1. A bearing assembly for a washing machine, the washing machine including a tub and a drum rotatable about an axis, the bearing assembly comprising:
   first and second bearings spaced apart along the axis;
   a spacer disposed at least partially between the first and second bearings; and
   a housing connectable with the drum, configured to contain the first and second bearings and the spacer, and including a generally annular rim extending axially away from the first and second bearings, and generally coaxial about the axis, the generally annular rim defining a seat for receiving a sealing element insertable therein, the housing forming a shoulder adjacent the seat, the shoulder being configured to be interposed between the sealing element and the first and second bearings such that the sealing element is axially spaced apart from the first and second bearings, wherein the generally annular rim has a front surface and a generally annular groove, the generally annular groove extending axially inwardly from the front surface toward a side of the bearing assembly, the generally annular groove being configured for engagement by stiffening means during molding of the housing to the tub, the generally annular groove defines a cylindrical bracket such that the generally annular groove is limited radially inwardly by the cylindrical bracket and radially outwardly by the generally annular rim;
   wherein the cylindrical bracket is bounded radially inwardly by the seat and radially outwardly by the generally annular groove, the cylindrical bracket having a front surface located at the same axial position as the front surface of the generally annular rim.

2. The bearing assembly as claimed in claim 1 wherein the housing is formed of a polymeric material and is molded to the tub.

3. The bearing assembly as claimed in claim 1, wherein the cylindrical bracket has a radial thickness lesser than a radial thickness of the generally annular rim.

4. The bearing assembly as claimed in claim 1, wherein the spacer is formed as a frame including an inner body, an outer body disposed coaxially about the inner body, and a radial partition wall connecting the inner and outer bodies.

5. The bearing assembly as claimed in claim 1, wherein the housing has an outer surface and at least one radial tooth extending from the outer surface and configured to engage with the tub so as to prevent rotation of the bearing assembly relative to the tub.

6. The bearing assembly as claimed in claim 1, wherein the front surfaces of both the generally annular rim and the cylindrical bracket are perpendicular to the axis.

7. The bearing assembly as claimed in claim 1, wherein the generally annular groove does not axially overlap the first or second bearings.

8. The bearing assembly as claimed in claim 1, wherein the seat is axially delimited on one side by an inlet bevel and axially delimited on a second side by the shoulder such that the sealing element does not contact any one of the first and second bearings.

9. A bearing assembly for a washing machine, the washing machine including a tub and a drum rotatable about an axis, the bearing assembly comprising:
   a wet side located on an axial side of the bearing assembly containing the drum;
   a dry side located on an axial side of the bearing assembly opposite from the wet side;
   first and second bearings spaced apart along the axis and provided with a plurality of external grooves along an outer ring of the first and second bearings;
   a spacer disposed at least partially between the first and second bearings, the spacer configured to radially delimit the first and second bearings such that the spacer is arranged axially and radially in contact with the first and second bearings; and
   a housing connectable with the drum, configured to contain the first and second bearings and the spacer, and including a generally annular rim extending axially away from the first bearing and second bearings, in the direction of the wet side, and generally coaxial about the axis, the generally annular rim defining a seat for receiving a sealing element insertable therein, the housing forming a shoulder proximate to the seat, the shoulder being configured to be interposed between the sealing element and the first and second bearings such that the sealing element is axially spaced apart from the first and second bearings, wherein the generally annular rim has a front surface and a generally annular groove, the generally annular groove extending axially inwardly from the front surface toward a side of the bearing assembly, the generally annular groove being configured for engagement by stiffening means during molding of the housing to the tub, the generally annular groove defines a cylindrical bracket such that the generally annular groove is limited radially inwardly by the cylindrical bracket and radially outwardly by the generally annular rim;

wherein the cylindrical bracket is bounded radially inwardly by the seat and radially outwardly by the generally annular groove, the cylindrical bracket having a front surface located at the same axial position as the front surface of the generally annular rim.

10. The bearing assembly for a washing assembly as claimed in claim 9, wherein the seat is axially delimited on one side by an inlet bevel and axially delimited on a second side by the shoulder such that the sealing element does not contact any one of the first and second bearings.

\* \* \* \* \*